(12) United States Patent
Krebs

(10) Patent No.: US 6,333,115 B1
(45) Date of Patent: Dec. 25, 2001

(54) THIN FILM ADHESIVE, METHOD OF MAKING, PRODUCTS MADE THEREFROM

(75) Inventor: Robert R. Krebs, Georgetown, TX (US)

(73) Assignee: Premark RWP Holdings, Inc., Wilmington, DE (US)

( * ) Notice: Subject to any disclaimer, the term of this patent is extended or adjusted under 35 U.S.C. 154(b) by 0 days.

(21) Appl. No.: 09/138,694

(22) Filed: Aug. 24, 1998

(51) Int. Cl.$^7$ ................................................. B32B 27/00
(52) U.S. Cl. ...................... 428/423.1; 428/423; 428/480; 428/500; 428/502; 428/505; 428/506; 428/515; 428/523; 525/106; 525/107; 525/123; 525/132; 525/154; 525/191; 525/222; 525/241
(58) Field of Search ................................ 428/423.1, 480, 428/429, 500, 502, 505, 506, 515, 523; 525/106, 107, 123, 132, 154, 191, 222, 241

(56) References Cited

U.S. PATENT DOCUMENTS

| | | | |
|---|---|---|---|
| 4,070,532 | 1/1978 | Hammer | 528/392 |
| 4,089,721 | 5/1978 | Sauder | 156/212 |
| 4,157,428 | 6/1979 | Hammer | 525/117 |
| 4,265,801 | * 5/1981 | Moody et al. | 524/430 |
| 4,348,491 | 9/1982 | Bertolucci et al. | 523/214 |
| 4,434,261 | 2/1984 | Brugel | 524/109 |
| 4,489,193 | 12/1984 | Goswami | 525/190 |
| 5,130,185 | 7/1992 | Ness | 428/41.9 |
| 5,166,266 | * 11/1992 | Machado et al. | 525/134 |
| 5,276,419 | 1/1994 | Griffin et al. | 335/216 |
| 5,322,908 | * 6/1994 | Hamazaki et al. | 525/445 |
| 5,376,419 | 12/1994 | Foster et al. | 428/40.4 |
| 5,385,987 | * 1/1995 | Hamazaki et al. | 525/445 |
| 5,447,789 | 9/1995 | Griffin | 428/308.4 |
| 5,624,737 | 4/1997 | Fairbanks | 428/138 |
| 5,869,593 | * 2/1999 | Helmeke et al. | 528/83 |
| 5,971,869 | * 10/1999 | Rajagopalan et al. | 473/371 |
| 6,030,705 | 2/2000 | Buoniconti et al. | 428/412 |

FOREIGN PATENT DOCUMENTS

| | | |
|---|---|---|
| 3331016 A | 10/1984 | (DE) . |
| 279777 A | 7/1988 | (EP) . |
| 816459 A2 | 1/1998 | (EP) . |
| 881066 A2 | 12/1998 | (EP) . |
| 1567375 | 5/1980 | (GB) . |
| WO 95/09200 | 4/1995 | (WO) . |
| 9906209 | 2/1999 | (WO) . |
| 9906210 | 2/1999 | (WO) . |

OTHER PUBLICATIONS

European Search Results—EP 99 11 6181.
European Search Report dated Apr. 7, 2000.

* cited by examiner

Primary Examiner—Leszek Kiliman
(74) Attorney, Agent, or Firm—Fulbright & Jaworski LLP

(57) ABSTRACT

A composition and adhesive film of a thermosetting resin and a terpolymer of an α-olefin, carbon monoxide and an ethylenically unsaturated carboxylic ester monomer, wherein the melt temperature of the terpolymer is less than the set temperature of the thermosetting resin. The film may be applied to a substrate to provide for an adhesive backing. The film may also be utilized to adhesively bond first and second substrates together.

23 Claims, 1 Drawing Sheet

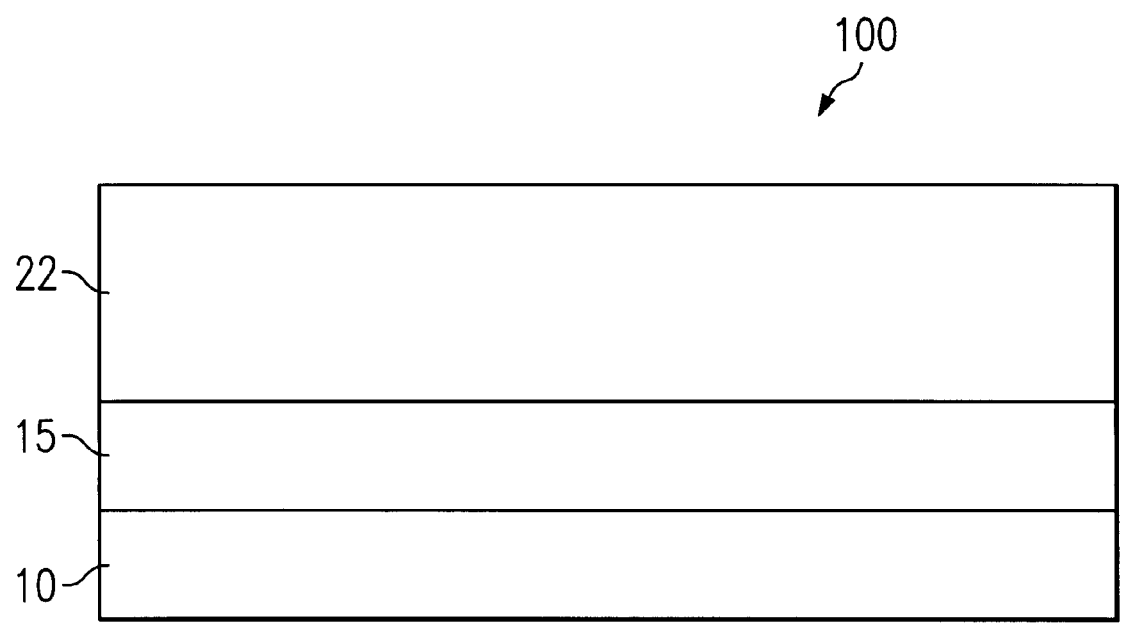

THIN FILM ADHESIVE, METHOD OF MAKING, PRODUCTS MADE THEREFROM

BACKGROUND OF THE INVENTION

1. Field of the Invention

The present invention relates to an adhesive composition, to films made therefrom, to a method of making such compositions and films, and to products made therefrom. In another aspect, the present invention relates to adhesive composition comprising a terpolymer of an α-olefin, carbon monoxide and an ethylenically unsaturated carboxylic ester monomer, and further comprising a thermosetting resin, to films made therefrom, to a method of making such compositions and films, and to products made therefrom.

2. Description of the Related Art

Decorative laminates prepared by heat and pressure consolidation have been produced commercially for a number of years, and have found widespread acceptance in the building and furniture industry as counter and table tops, bathroom and kitchen work surfaces, wall paneling, partitions and doors. Such decorative laminates can be described as containing a number of laminae that are consolidated to form a unitary structure carrying a surface decoration which can range from something as simple as a solid color to something as complex as an embossed simulated wood grain finish.

More specifically, a decorative laminate generally comprises plural layers of synthetic resin impregnated paper sheets consolidated or bonded together into a unitary structure under heat and pressure. In normal practice the decorative laminate assembly, from the bottom up, consists of a core of one or more sheets impregnated with phenolic resin, above which lies a decorative sheet impregnated with melamine resin.

The core or base member functions to impart rigidity to the laminate and usually comprises a solid substrate which may or may not be formed prior to the initial laminating step. Prior to stacking, the sheets of the core member are impregnated with water alcohol solution of phenol formaldehyde, dried and partially cured in a hot air oven, and finally cut into sheets. Examples of such a base or core member include a plurality of sheets of 90 to 150 pound ream kraft paper impregnated throughout and bonded with a substantially completely cured phenolic resin which has been converted to the thermoset state during the initial laminating step, a precured plastic laminate, such as glass fiber-reinforced thermoset polyester resin laminates and the like, a wood product, such as hardboard, woodwaste or particle boards, plywood, and the like, a meneral base board, such as cement-asbestos board, sheet rock, plaster board, and the like, or a combination of these substrates.

The decorative sheet generally functions to give an attractive appearance to the laminate, and also gives the panel its surface characteristics (i.e. resistance to chemical agents, to heat, to light, to shock and to abrasion). It is generally high quality 50 to 125 ream weight, pigment filled, alpha cellulose paper that has been impregnated with a solution of melamine-formaldehyde resin, dried and partially cured, and finally cut into sheets. The decorative sheet, prior to impregnation with the resin, may be of a solid color or may comprise a decorative design, or a photo-gravure reproduction of natural materials, such as wood marble, leather, etc.

The decorative laminate is generally obtained by placing the resin impregnated core and decorative sheets between steel plates and subjecting the laminate stack to temperatures in the range of about 200° F. to about 350° F. and pressures in the range of about 800–1600 psi for a time sufficient to consolidate the laminate and cure the resins (generally about 25 minutes to an hour). This causes the resin in the paper sheets to flow, cure and consolidate the sheets into a unitary laminated mass referred in the art as a decorative high-pressure laminate. Continuous methods are also know for making decorative laminates.

Generally, more than one laminate is formed at one time by inserting a plurality of assembled sheets in a stack with each assembly being separated by a release sheet which allows the individual laminates to be separated after consolidation.

Finally, the decorative laminates so formed are then bonded to a reinforcing substrate, such as plywood, hardboard, asbestos board, particle board or the like, by the use of adhesives such as contact adhesives, urea-formaldehyde, white flues (polyvinyl acetate emulsions) hot melts, phenolic or resorcinol-formaldehyde epoxy, coal tar, animal glues, and the like. The glues vary in their cost and reliability. Very commonly the type of glue used in the industry is either a solvent based contact adhesive, or a water-based contact adhesive. An example of a common specific glue used is a polyvinyl acetate emulsion contact adhesive.

While these water-based or solvent-basedthis polyvinyl acetate emulsion glue are inexpensive and reliable, they must be applied at the time of application of the decorative laminate to the substrate since they set up in relatively short order, and are applied in liquid form which may cause application difficulties.

There is a need in the art for an adhesive which can be applied to the decorative laminate far in advance of adhering the decorative laminate to the substrate.

There is another need in the art for an adhesive which does not need to be applied in liquid form.

These and other needs in the art will become apparent to those of skill in the art upon review of this specification, including its drawings and claims.

SUMMARY OF THE INVENTION

It is an object of the present invention to provide for an adhesive which can be applied to the decorative laminate far in advance of adhering the decorative laminate to the substrate.

It is another abject of the present invention to provide for an adhesive which does not need to be applied in liquid form.

These and other object of the present invention will become apparent to those of skill in the art upon review of this specification, including its drawings and claims.

According to one embodiment of the present invention, there is provided a composition which includes a terpolymer of an α-olefin, carbon monoxide and an ethylenically unsaturated carboxylic ester monomer, and further includes a thermosetting resin. For the composition, the melt temperature of the terpolymer is less than the set temperature of the thermosetting resin. A further embodiment of making the composition would include contacting together the above described components to form the composition.

According to another embodiment of the present invention, there is provided an adhesive film made from the above composition.

According to even another embodiment, there is provided a method of making the above film. The method generally includes heating the above composition, to a temperature that is above the melt temperature of the terpolymer and below the set temperature of the thermosetting resin, wherein the melt temperature of the terpolymer is less than the set temperature of the thermosetting resin. The method also includes forming the heated mixture into a film. Finally, the method includes cooling the film to below the melting temperature of the terpolymer.

According to still another embodiment of the present invention, there is provided a product with an adhesive backing. The product generally includes a substrate with the above described film affixed to the substrate.

According to yet another embodiment of the present invention, there is provided a method of making the product with an adhesive backing. The method generally includes affixing to a substrate the above described film.

According to even still another embodiment of the present invention, there is provided a product having a first substrate and a second substrate, with the above described adhesive film positioned between the first and second substrates and affixed to each.

According to even yet another embodiment of the present invention, there is provided a method of making the above product. The method generally includes, positioning between a first substrate and second substrate, and affixing to each substrate, the adhesive film. The adhesive film is generally adhered by heating it above the thermosetting temperature of the resin.

These and other embodiments of the present invention will become apparent to those of skill in the art upon review of this specification, including its drawings and claims.

BRIEF DESCRIPTION OF THE DRAWINGS

FIG. 1 is a cross-sectional view of product 100 of the present invention including a decorative member 22 which is preferably a decorative laminate, adhesive film of the present invention 15, and a substrate 10.

DETAILED DESCRIPTION OF THE INVENTION

The adhesive composition and adhesive film of the present invention includes a terpolymer of an α-olefin, carbon monoxide and an ethylenically unsaturated carboxylic ester monomer, and further includes a thermosetting resin.

The α-olefin utilized in the copolymers of the present invention generally comprises at least 2 carbon atoms. Preferably, the α-olefin utilized in the copolymers of the present invention comprises from about 2 to about 8 carbon atoms, more preferably from about 2 to about 4 carbon atoms, and most preferably from about 2 to about 3 carbon atoms. Preferable examples of suitable α-olefins includes ethylene, propylene and butylene. Most preferably, the α-olefin utilized in the present invention is ethylene.

The ethylenically unsaturated carboxylic ester monomers utilized in the copolymers of the present invention are selected from the group of vinyl esters of saturated carboxylic acids and alkyl esters of an α,β-ethylenically unsaturated carboxylic acids. Examples of suitable ester monomers include methyl acrylate, ethyl acrylate, butyl acrylate, isobutyl acrylate, methyl methacrylate, diethyl maleate, dimethyl fumarate, vinyl acetate, vinyl propionate and the like. Preferably the copolymer contains one of the following ester monomers: methyl acrylate, ethyl acrylate and vinyl acetate. Most preferably, the copolymer ethylene vinyl acetate.

The weight percentages of the various terpolymer components of α-olefin, carbon monoxide and ethylenically unsaturated carboxylic ester monomer will generally be selected to provide the terpolymer with the desired physical properties for the adhesive application. The terpolymer of the present invention will generally comprise in the range of about 40 to about 95 weight percent percent α-olefin, in the range of about 1 to about 15 weight percent carbon monoxide, and in the range of about 4 to about 45 weight percent ethylenically unsaturated carboxylic ester, all based on the total weight of α-olefin, carbon monoxide, and ethylenically unsaturated carboxylic ester. Preferably, the terpolymer will comprise in the range of about 50 to about 80 weight percent α-olefin, in the range of about 5 to about 12 weight percent carbon monoxide, and in the range of about 15 to about 38 weight percent ethylenically unsaturated carboxylic ester. More preferably, the terpolymer will comprise in the range of about 60 to about 70 weight percent α-olefin, in the range of about 23 to about 30 weight percent carbon monoxide, and in the range of about 7 to about 10 weight percent ethylenically unsaturated carboxylic ester.

It is critical that the terpolymer must be selected so that its melt temperature ($T_M$) is less than the set temperature of the thermosetting resin. Preferably, the terpolymer is selected so that its melt temperature ($T_M$) is at least 10° C. less than the set temperature of the thermosetting resin, more preferably in the range of about 30° C. to about 40° C. less.

The melt flow index of the copolymer of an α-olefin, carbon monoxide and an ethylenically unsaturated carboxylic ester monomer utilized in the present invention will generally be selected to provide the copolymer with the desired physical properties for the adhesive application. Generally, the melt flow index will be in the range of about 0.5 to about 100, preferably in the range of about 1 to about 50, and more preferably in the range of about 5 to about 40.

Methods and catalysts for obtaining the terpolymer of the present invention are well known to those of skill in the art. In fact, such terpolymers are commercially available. Non-limiting examples of commercially available terpolymers useful in the present invention include Du Pont's ELVALOY 742, an ethylene, vinyl acetate, carbon monoxide terpolymer, with a melt index of 35.0±10 (modified ASTM D1238), with a composition of 28.5±1 weight percent vinyl acetate, 9.0±1 carbon monoxide, with the balance ethylene; Du Pont's ELVALOY HP441, an ethylene, vinyl acetate, carbon monoxide terpolymer, with a melt index of 8.0±7 (modified ASTM D1238); and Du Pont's ELVALOY 4924, an ethylene, vinyl acetate, carbon monoxide terpolymer, with a melt index of 15.0±8 (modified ASTM D1238), with a composition of 20.5±2 weight percent vinyl acetate, 8.0±1 carbon monoxide, with the balance ethylene.

It should be understood that in the practice of the present invention, more than one terpolymer as described about may be utilized in the composition and film.

The thermosetting resin of the present invention may be any suitable thermosetting resin having a set temperature above the melt temperature of the terpolymer, that will provide suitable adhesive properties for the desired application. Non-limiting examples of suitable types of thermosetting resins include phenolic, melamine, urea formaldehyde, amino, epoxy, polyester, silicon, acrylic, urethanes, and diallyl phthalate resins, just to name a few. The preferred resins are phenolic and melamine, with phenolic resins being the most preferred.

It should be understood in the practice of the present invention, that more than one thermosetting resin may be utilized in the composition and film.

The adhesive composition of the present invention will generally include in the range of about 1 to about 99 weight percent terpolymer and in the range of about 99 to about 1 weight percent thermosetting resin, all based on the weight of terpolymer and thermosetting resin. Preferably, the adhesive composition will include in the range of about 20 to about 80 weight percent terpolymer and in the range of about 80 to about 20 weight percent thermosetting resin, even more preferably, in the range of about 40 to about 60 weight percent terpolymer and in the range of about 60 to about 40 weight percent thermosetting resin, even more preferably, about 50 weight percent terpolymer and about 50 weight percent thermosetting resin.

The adhesive composition of the present invention may include additives as are well known to those in the adhesive art, as desired and/or necessary, antioxidants, antiblock agents, slip agents, cross linking agents, stabilizers, ultraviolet ray absorbers, lubricants, foaming agents, antistatic agents, organic and inorganic flame retardants, plasticizers, dyes, pigments, talc, calcium carbonate, carbon black, mica, glass fibers, carbon fibers, aramid resin, asbestos, as well as other fillers as are known in the art.

The adhesive film of the present invention is generally made by heating the terpolymer and thermosetting resin to a temperature above the terpolymer melting temperature, but below the set temperature of the thermosetting resin, and then forming the thermosetting and melted terpolymer mixture into a film. While a wide variety of methods for making film from melted polymers are known to exist, such as molding thin films, blow molding, or utilizing rollers, the preferred method is to utilize extrusion.

The adhesive film of the present invention finds utility in a wide variety of applications. In general, the adhesive film of the present invention is suitable for providing an adhesive backing to a wide variety of materials, and for adhesively bonding a first surface to a second surface.

One product of the present invention may be formed by applying the inventive adhesive film to a substrate to provide a substrate with an adhesive backing. For example, the adhesive film may be applied to a structural member such as particle board or the like to allow for convenient bonding of decorative laminates thereto. As another example, the adhesive film may be applied to a decorative member, such as wall paper, coverings or panels, or floor coverings such as tile, vinyl, synthetic stone, or stone, to allow for convenient application of these items to another surface or a supportive member.

Another product of the present invention would be an adhesively bonded structure comprising first and second members with the adhesive film positioned therebetween and adhesively bonding the first and second members together. For example, see FIG. 1 showing a cross-sectional view of product 100 of the present invention including a decorative member 22 which is preferably a decorative laminate, adhesive film of the present invention 15, and a substrate 10.

EXAMPLES

The following non-limiting examples are provided merely to illustrate the present invention and are not meant to limit the scope of the claims of the present invention.

Extrusion Equipment

All extrusion experiments were performed on a standard commercially available twin screw corotating extruder manufactured by Berstorf. The screws were 25 mm in diameter, and selected to give good mixing of the ingredients used in the experiments. The barrel segments are equiped with heating and cooling elements. The die is of the standard coat hanger type and is equipped with active heating only. Typical feed rates for the extruder are 15 pounds of total material per hour which includes the base polymer and any additives. The base polymer and all additives were added at the main feed throat by gravity. The main feed throat is located in the first barrel segment of the extruder. The base polymer and all additives were metered into the main feed throat with volumetric feeders which calibrated to deliver the amount of material required for the experiments. Material extruded from the die was passed through a 3 roll stack. The chromed rolls of the stack were actively cooled to prevent the film from sticking to them. Typically the temperature of the cooled rolls was 5–10° C. The plastic film was stored at room temperature.

Materials

The chemicals used for the experiments were all of commercial quality. Elvaloy 741, Elvaloy 640, and Elvaloy ES were purchased form E.I. du Pont de Nemours and Company, DuPont Packaging and Industrial Polymers, 1007 Market Street, DuPont Building, Wilmington, Del. 19090, USA Powdered Phenolic Resin GP-5510, was purchased from Georgia-Pacific Corporation, Georgia-Pacific Resins, Inc., P.O. Box 938, Lufkin, Tex. 75902-0938, USA Powdered melamine resin was purchased from BTL Speciality Resins Corporation, P.O. Box 2570, Toledo, Ohio 43606, USA Powdered talc was purchased from Polar Minerals, Inc., 1703 Bluff road, Mt. Vernon, Ind. 47620, USA Powdered calcium carbonate was purchased from ECC International, 5775 Peachtree-Dunwoody Road, Ste. 200-G, Atlanta, Ga. 30342, USA

Typical Procedure

The extruder and die are thermally conditioned at a temperature great enough to melt and process the base polymer into film but kept at a low enough temperature so that the powdered melamine resin or powdered phenolic resin do not noticeably react with the base polymer or with themselves to increase the viscosity to the point that films cannot be extruded from the die. This is especially important because these powdered melamine and phenolic resins have the ability to crosslink in the extruder which will require extensive maintenance to free the screws and resume normal operation of the extruder.

Example 1 (Elvaloy 742 Control)

Neat base polymer, Elvaloy 742, was added to the twin screw extruder at a rate of 15 pounds per hour. The barrels were heated to 70° C. and the die was heated to 80° C. The 3 three rolls of the calendar were cooled to 5° C. A film was extruded and passed through the 3 roll stack where pressure between the rolls produced a smooth surfaced film of approximately 0.006 inches thick. This film acted as a control for subsequent samples which contained additives.

Example 2 (Elvaloy 742)

Neat base polymer, Elvaloy 742, was metered into the main feed throat of the twin screw extruder at a rate of 12 pounds per hour. Also metered into the main feed throat was 3 pounds per hour of GP-5520, powdered phenolic resin. The barrels were maintained at 70° C. and the die was set at 80° C. Cooling is possible on the barrels but the die is air cooled only. The extruded film is light yellow in color and homogenous to the naked eye. This procedure was repeated for the conditions with increasing amounts of GP-5520 until the ratio of GP-5520 to base polymer approached 1 in which case the material no longer produced an extrudable film.

Example 3 (Elvaloy 4924 Control)

Same procedure as Example 1, except that Elvaloy 4924 was substituted for Elvaloy 742.

Example 4 (Elvaloy 4924)

Same procedure as Example 2, except that Elvaloy 4924 was substituted for Elvaloy 742.

Example 5 (Elvaloy HP-661 Control)

Same procedure as Example 1, except that Elvaloy HP-661 was substituted for Elvaloy 742.

Example 6 (Elvaloy HP-661)

Same procedure as Example 2, except that Elvaloy HP-661 was substituted for Elvaloy 742.

Example 7 Preparation of Samples for Plug Tests and Creep Rupture Testing

Preparation of Bonded Film Samples

Extruded film made as described above was sandwiched between a piece of standard grade laminate (commercially available Wilsonart brand laminate grade 107, 0.050 inches thick ) the sanded side of the laminate, and a piece of clean 0.75 inch thick, 45 pound industrial particle board. The samples were cut to measure 6×6 inches square. This formed sandwich was then placed in a quick closing, hydraulic press with preheated plattens at 325° F. A piece of paperbacked, aluminum foil was placed between the platens and the laminate surface and particle board surface to prevent any material from contaminating the plattens during the press cycle. The press was closed and pressure maintained at 66 pounds per square inch (psi) for 30 seconds. The press was opened after 30 seconds and the sample was immediately removed and allowed to cool to room temperature without additional pressure on its surfaces.

Preparation of Plug Samples

The bonded film samples made as described above, were cut into strips 2.5 inches wide and at least 5.25 inches long. No effort was made to maintain the machine direction orientation of the extruded film. The face or decorative laminate side was drilled with a 1.75 inch outside diameter hole saw bit, equipped with a 0.25 inch pilot high speed drill bit long enough to penetrate the backside of the particle board when the large diameter bit has penetrated the laminate and film. The distance the large diameter hole saw bit penetrates must be at least the thickness of the high pressure laminate and extruded film, but not more than 0.0625 inches into the particle board, so that the plane between the extruded film and particle board has been severed. If done manually with a drill press the operator will sense when the particle board has been reached. The next step is to drill from the backside with a 1.00 inch wood boring bit, also known as a paddle bit. Using the pilot hole from the previous step, drill until the wood boring bit removes all of the particle board but does not remove any of the high pressure decorative laminate.

Example 8 Instron Testing

A model 4204 Instron machine was used to quantitate the bond strength between the laminate-extruded film-particle board interfaces. The Instron unit was equipped with a 10,000 pound load cell. The Instron was programmed to pull the sample apart at a rate of 1 inch per minute. Failure of the bond was noted by a decrease in the tension as the sample was pulled apart. The data were recorded by an automated program and five plugs were run of each experimental condition. The Instron program calculated the mean, standard deviation and mediam stress values in pounds per square inch (psi) at maximum load for each set of five plugs. These values are reported in Tables 2 and 5.

Example 9 Creep Rupture Testing

The bonded film samples described above were cut into strips 2.0 inches wide and 5.0 inches long. A bandsaw was used to make a cut into the decorative side of the high pressure laminate. The cut was located 2.5 inches from what will become the load end of the sample. This cut was made through the decorative side of the high pressure laminate, through the extruded film, and 0.0625 inches into the particle board. From the backside, remove particle board so that 0.5 inches by 2.0 inches of high pressure decorative laminate are exposed. Drill a 0.25 inch hole in the center of the exposed piece of hpl. Secure the sample decorative side down in a holding device. Secure a 20 pound weight through the hole to the sample being tested. The samples were placed in controlled temperature room at approximately 72 degrees F. Record the time that the experiment starts and then record when the sample fails and the weight drops away from the structure. Results are provided in Tables III and VI.

TABLE I (sample descriptions for Tables II and III)

| SAMPLE | BASE | % | ADDITIVE | % |
|---|---|---|---|---|
| 1 | ELVALOY 742 | 100 | NONE | 0 |
| 2 | ELVALOY 742 | 80 | MF-304 | 20 |
| 3 | ELVALOY 742 | 80 | GP-5520 | 20 |
| 4 | ELVALOY 742 | 80 | ATOMITE | 20 |
| 5 | ELVALOY 4924 | 100 | NONE | 0 |
| 6 | ELVALOY 4924 | 80 | MF-304 | 20 |
| 7 | ELVALOY 4924 | 80 | GP-5520 | 20 |
| 8 | ELVALOY HP-661 | 80 | ATOMITE | 20 |
| 9 | ELVALOY HP-661 | 100 | NONE | 0 |
| 10A | ELVALOY HP-661 | 80 | MF-304 | 20 |
| 11B | ELVALOY HP-661 | 80 | GP-5520 | 20 |
| 12C | ELVALOY HP-661 | 80 | ATOMITE | 20 |

TABLE II

PLUG TEST VALUES

| SAMPLE | MEAN | S.D. | MEDIAN |
|---|---|---|---|
| 1 | 78.010 | 13.662 | 77.850 |
| 2 | 88.854 | 12.844 | 93.420 |
| 3 | 135.160 | 34.132 | 123.800 |
| 4 | 128.480 | 11.215 | 125.900 |
| 5 | 74.358 | 9.351 | 76.240 |
| 6 | 106.638 | 41.297 | 116.000 |
| 7 | 146.000 | 28.902 | 152.500 |
| 8 | 46.300 | 21.197 | 40.260 |
| 9 | 68.676 | 21.431 | 58.250 |
| 10 (A) | 59.648 | 22.206 | 63.350 |
| 11 (B) | 140.560 | 25.182 | 142.300 |
| 12 (C) | 112.048 | 11.742 | 116.000 |

TABLE III

CREEP RUPTURE

| SAMPLE | 1 | | 2 | | 3 | | 4 |
|---|---|---|---|---|---|---|---|
| 1 | >27.3 | <45.3 | >1.5 | <4.0 | >47.0 | <49.3 | |
| 2 | >27.3 | <45.3 | >30.2 | <30.9 | >69.7 | <72.7 | |
| 3 | >1140.4 | | >1140.4 | | >1402.8 | | |
| 4 | >27.3 | <45.3 | >104.7 | <121.7 | >50.7 | <53.2 | |
| 5 | >3.5 | <4.0 | >415.3 | <478.0 | >836.5 | <923.5 | |
| 6 | >795.2 | <798.2 | >57.2 | <70.9 | >1.0 | <1.3 | >1306.7 |
| 7 | >1140.4 | | >1140.4 | | >1402.8 | | |
| 8 | | <0.3 | <510.2 | <573.2 | >176.0 | <190.3 | |
| 9 | >76.3 | <89.8 | >29.0 | <42.8 | >151.8 | <166.3 | |
| 10 (A) | | <0.5 | >3.5 | <27.5 | >29.4 | <42.9 | |
| 11 (B) | >1140.4 | | >1140.4 | | >1402.8 | | |
| 12 (C) | >45.3 | <65.8 | >53.2 | <66.9 | >29.0 | <42.8 | |

TABLE IV (Sample descriptions for Tables V and VI)

| SAMPLE | BASE | % MF-304 % | GP-5520 % | ATOMIMTE % |
|---|---|---|---|---|
| 1 | ELVALOY 742 | 100 | 0 | 0 | 0 |
| 2 | ELVALOY 742 | 80 | 0 | 20 | 0 |
| 3 | ELVALOY 742 | 70 | 0 | 30 | 0 |
| 4 | ELVALOY 742 | 60 | 0 | 40 | 0 |
| 5 | ELVALOY 742 | 70 | 30 | 0 | 0 |
| 6 | ELVALOY 742 | 60 | 40 | 0 | 0 |
| 7 | ELVALOY 742 | 70 | 0 | 0 | 30 |
| 8 | ELVALOY 742 | 60 | 0 | 0 | 40 |
| 9 | ELVALOY 742 | 80 | 10 | 10 | 0 |
| 10 | ELVALOY 742 | 80 | 0 | 10 | 10 |
| 11 | ELVALOY 4924 | 100 | 0 | 0 | 0 |
| 12 | ELVALOY 4924 | 80 | 0 | 20 | 0 |
| 13 | ELVALOY 4924 | 70 | 0 | 30 | 0 |
| 14 | ELVALOY 4924 | 60 | 0 | 40 | 0 |
| 15 | ELVALOY 4924 | 70 | 30 | 0 | 0 |
| 16 | ELVALOY 4924 | 60 | 40 | 0 | 0 |
| 17 | ELVALOY 4924 | 70 | 0 | 0 | 30 |
| 18 | ELVALOY 4924 | 60 | 0 | 0 | 40 |
| 19 | ELVALOY 4924 | 80 | 10 | 10 | 0 |
| 20 | ELVALOY 4924 | 80 | 0 | 10 | 10 |
| 21 | ELVALOY HP-661 | 100 | 0 | 0 | 0 |
| 22 | ELVALOY HP-661 | 80 | 0 | 20 | 0 |
| 23 | ELVALOY HP-661 | 70 | 0 | 30 | 0 |
| 24 | ELVALOY HP-661 | 60 | 0 | 40 | 0 |
| 25 | ELVALOY HP-661 | 70 | 30 | 0 | 0 |
| 26 | ELVALOY HP-661 | 60 | 40 | 0 | 0 |
| 27 | ELVALOY HP-661 | 70 | 0 | 0 | 30 |
| 28 | ELVALOY HP-661 | 60 | 0 | 0 | 40 |
| 29 | ELVALOY HP-661 | 80 | 10 | 10 | 0 |
| 30 | ELVALOY HP-661 | 80 | 0 | 10 | 10 |

TABLE V

Plug Test Values

| SAMPLE | MEAN | S.D. | MEDIAN |
|---|---|---|---|
| 1 | 99.238 | 11.373 | 105.000 |
| 2 | 97.394 | 16.418 | 95.830 |
| 3 | 89.384 | 19.132 | 90.200 |
| 4 | 91.106 | 43.039 | 104.400 |
| 5 | 84.232 | 33.233 | 87.510 |
| 6 | 78.295 | 9.277 | 77.710 |
| 7 | 98.318 | 23.571 | 101.200 |
| 8 | 59.977 | 21.673 | 67.110 |
| 9 | 102.452 | 22.468 | 99.060 |
| 10 | 67.968 | 7.522 | 68.450 |
| 11 | 24.493 | 15.771 | 17.180 |
| 12 | 55.742 | 22.814 | 56.100 |
| 13 | 108.944 | 5.960 | 111.700 |
| 14 | 61.074 | 32.404 | 61.605 |
| 15 | 49.444 | 8.463 | 51.000 |
| 16 | 63.120 | 40.009 | 81.070 |
| 17 | 61.830 | 35.044 | 78.115 |
| 18 | 52.764 | 31.209 | 71.400 |
| 19 | 58.319 | 31.234 | 62.545 |
| 20 | 118.050 | 19.110 | 126.700 |

TABLE V-continued

Plug Test Values

| SAMPLE | MEAN | S.D. | MEDIAN |
|---|---|---|---|
| 21 | 54.866 | 9.673 | 58.250 |
| 22 | 80.080 | 20.230 | 82.680 |
| 23 | 93.252 | 8.488 | 95.030 |
| 24 | 73.148 | 27.544 | 77.980 |
| 25 | 107.038 | 30.105 | 106.800 |
| 26 | 68.407 | 30.008 | 80.130 |
| 27 | 15.165 | 11.496 | 13.285 |
| 28 | 22.203 | 19.369 | 13.950 |
| 29 | 61.626 | 24.296 | 72.480 |
| 30 | 83.568 | 16.836 | 78.920 |

TABLE VI

CREEP RUPTURE

| SAMPLE | 1 | 2 | 3 | 4 |
|---|---|---|---|---|
| 1 | <16.5 | <15.0 | >17.5 <19.0 | |
| 2 | >1569.3 | >1477.3 | >1306.7 | >1449.8 |
| 3 | >1569.3 | >1449.8 | >1477.3 | |
| 4 | >1569.3 | <1.5 | <0.5 | >1477.3 |
| 5 | >26.8 <39.0 | <15.0 | >50.5 <74.3 | |
| 6 | >26.8 <39.0 | >219.7 <236.7 | >8.0 <31.8 | |
| 7 | >16.5 <26.8 | >26.5 <41.5 | >2.5 <17.5 | |
| 8 | >26.8 <39.0 | >26.5 <41.5 | >26.5 <41.0 | |
| 9 | >137.0 <138.5 | >587.1 <600.9 | >701.2 <715.4 | |
| 10 | >1569.3 | >1220.8 <1281.8 | >1449.8 | |
| 11 | >39.0 <63.0 | <0.5 | >718.3 <734.6 | |
| 12 | >1569.3 | >1414.3 <1477.3 | >1306.7 | |
| 13 | >1569.3 | >142.6 <143.3 | >1477.3 | |
| 14 | >1569.3 | >1477.3 | >1140.4 | |
| 15 | <16.5 | >50.5 <65.5 | <3.0 | |
| 16 | >1569.3 | <0.5 | >80.8 <94.3 | |
| 17 | <16.5 | >122.3 <140.3 | <0.5 | |
| 18 | <16.5 | >6.3 <7.6 | >31.8 <49.8 | |
| 19 | <16.5 | >26.5 <41.5 | >0.5 <1.0 | |
| 20 | >1569.3 | >1477.3 | >566.3 | |
| 21 | <16.5 | >50.5 <65.5 | >8.25 <22.5 | |
| 22 | >1569.3 | >1477.3 | >1306.7 | |
| 23 | >1569.3 | >1477.3 | >1140.4 | |
| 24 | >1569.3 | >1477.3 | >1140.4 | |
| 25 | >16.5 >26.8 | >26.5 <41.5 | >80. <31.8 | |
| 26 | <16.5 | >26.5 <41.5 | <1.5 | |
| 27 | <16.5 | >8.3 <21.8 | >8.0 <31.8 | |
| 28 | <16.5 | <15.0 | <0.3 | |
| 29 | >1569.3 | >45.5 <48.5 | >1477.3 | |
| 30 | >1316.5 <1331.0 | >247.8 <310.8 | >1477.3 | >1140.4 |

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which this invention pertains.

I claim:

1. A composition comprising:
   (a) a terpolymer of an α-olefin, carbon monoxide and an ethylenically unsaturated carboxylic ester monomer; and
   (b) a thermosetting resin;
   wherein the melt temperature of the terpolymer is less than the set temperature of the thermosetting resin.

2. The composition of claim 1 wherein the α-olefin is selected from the group consisting of ethylene, propylene and butylene.

3. The composition of claim 1 further comprising another resin selected from the group of resins consisting of amino, epoxy, polyester, silicon, acrylic, urethanes, and diallyl phthalate resins.

4. The composition of claim 1 wherein the terpolymer comprises in the range of about 40 to about 95 weight percent α-olefin, in the range of about 1 to about 15 weight percent carbon monoxide, and in the range of about 4 to about 45 weight percent ethylenically unsaturated carboxylic ester, all based on the total weight of α-olefin, carbon monoxide, and ethylenically unsaturated carboxylic ester.

5. The composition of claim 1 wherein the α-olefin is ethylene, the thermosetting resin is selected from the group consisting of phenolic and melamine resins.

6. The composition of claim 5 wherein the terpolymer comprises in the range of about 50 to about 80 weight percent α-olefin, in the range of about 5 to about 12 weight percent carbon monoxide, and in the range of about 15 to about 38 weight percent ethylenically unsaturated carboxylic ester, all based on the total weight of α-olefin, carbon monoxide, and ethylenically unsaturated carboxylic ester.

7. A film comprising:
   (a) a terpolymer of an α-olefin, carbon monoxide and an ethylenically unsaturated carboxylic ester monomer; and
   (b) a thermosetting resin;
   wherein the melt temperature of the terpolymer is less than the set temperature of the thermosetting resin.

8. The film of claim 7 wherein the α-olefin is selected from the group consisting of ethylene, propylene and butylene.

9. The film of claim 7 wherein the thermosetting resin is selected from the group of resins consisting of phenolic, melamine, urea formaldehyde, amino, epoxy, polyester, silicon, acrylic, urethanes, and diallyl phthalate resins.

10. The film of claim 7 wherein the terpolymer comprises in the range of about 50 to about 80 weight percent $\alpha$-olefin, in the range of about 5 to about 12 weight percent carbon monoxide, and in the range of about 15 to about 38 weight percent ethylenically unsaturated carboxylic ester, all based on the total weight of $\alpha$-olefin, carbon monoxide, and ethylenically unsaturated carboxylic ester.

11. The film of claim 7 wherein the $\alpha$-olefin is ethylene, the thermosetting resin is selected from the group consisting of phenolic and melamine resins.

12. The film of claim 11 therein the terpolymer comprises in the range of about 60 to about 70 weight percent $\alpha$-olefin, in the range of about 23 to about 30 weight percent carbon monoxide, and in the range of about 7 to about 10 weight percent ethylenically unsaturated carboxylic ester, all based on the total weight of $\alpha$-olefin, carbon monoxide, and ethylenically unsaturated carboxylic ester.

13. A method of making a film, the method comprising:
   (a) heating a mixture of a thermosetting resin and a terpolymer of an $\alpha$-olefin, carbon monoxide and an ethylenically unsaturated carboxylic ester monomer, to a temperature that is above the melt temperature of the terpolymer and below the set temperature of the thermosetting resin, wherein the melt temperature of the terpolymer is less than the set temperature of the thermosetting resin;
   (b) forming the heated mixture into a film; and
   (c) cooling the film to below the melting temperature of the terpolymer.

14. A product comprising:
   (a) a substrate;
   (b) an adhesive film affixed to the substrate, wherein the film comprises a thermosetting resin and a terpolymer of an $\alpha$-olefin, carbon monoxide and an ethylenically unsaturated carboxylic ester monomer, wherein the melt temperature of the terpolymer is less than the set temperature of the thermosetting resin.

15. The product of claim 14 wherein the $\alpha$-olefin is selected from the group consisting of ethylene, propylene and butylene.

16. The product of claim 14 wherein the film comprises another resin selected from the group of resins consisting of amino, epoxy, polyester, silicon, acrylic, urethanes, and diallyl phthalate resins.

17. The product of claim 14 wherein the terpolymer comprises in the range of about 40 to about 95 weight percent $\alpha$-olefin, in the range of about 1 to about 15 weight percent carbon monoxide, and in the range of about 4 to about 45 weight percent ethylenically unsaturated carboxylic ester, all based on the total weight of $\alpha$-olefin, carbon monoxide, and ethylenically unsaturated carboxylic ester.

18. The product of claim 14 wherein the $\alpha$-olefin is ethylene, the thermosetting resin is selected from the group consisting of phenolic and melamine resins.

19. The product of claim 18 wherein the terpolymer comprises in the range of about 50 to about 80 weight percent $\alpha$-olefin, in the range of about 5 to about 12 weight percent carbon monoxide, and in the range of about 15 to about 38 weight percent ethylenically unsaturated carboxylic ester, all based on the total weight of $\alpha$-olefin, carbon monoxide, and ethylenically unsaturated carboxylic ester.

20. A method of making a product, the method comprising: providing a substrate; and affixing to said substrate, an adhesive film comprising:
   a thermosetting resin; and
   a terpolymer of an $\alpha$-olefin, carbon monoxide and an ethylenically unsaturated carboxylic ester monomer, wherein the melt temperature of the terpolymer is less than the set temperature of the thermosetting resin.

21. A product comprising:
   (a) a first substrate;
   (b) a second substrate; and
   (b) an adhesive film positioned between the first and second substrates and affixed to each, wherein the film comprises a thermosetting resin and a terpolymer of $\alpha$-olefin, carbon monoxide and an ethylenically unsaturated carboxylic ester monomer, wherein the melt temperature of the terpolymer is less than the set temperature of the thermosetting resin.

22. A method of making a product, the method comprising: positioning between a first substrate and a second substrate an adhesive film; and affixing to each substrate, said film comprising:
   a thermosetting resin; and
   a terpolymer of an $\alpha$-olefin, carbon monoxide and an ethylenically unsaturated carboxylic ester monomer, wherein the melt temperature of the terpolymer is less than the set temperature of the thermosetting resin.

23. The film of claim 7 wherein composition of said film provides an enhanced adhesive property to said film.

* * * * *